United States Patent
Sahagun et al.

(10) Patent No.: US 12,153,871 B2
(45) Date of Patent: Nov. 26, 2024

(54) FINE-GRAINED CONTROL OF VISUAL DISPLAY AND SCALING ATTRIBUTES

(71) Applicant: KYOCERA Document Solutions, Inc., Osaka (JP)

(72) Inventors: Allan Sahagun, Oakland, CA (US); Michaela Guerrera, Berkeley, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 147 days.

(21) Appl. No.: 17/824,397

(22) Filed: May 25, 2022

(65) Prior Publication Data
US 2023/0385526 A1 Nov. 30, 2023

(51) Int. Cl.
| | |
|---|---|
| G06F 40/117 | (2020.01) |
| G06F 3/0482 | (2013.01) |
| G06F 3/04845 | (2022.01) |
| G06F 3/04847 | (2022.01) |
| G06F 16/958 | (2019.01) |
| G06F 40/106 | (2020.01) |
| G06F 40/143 | (2020.01) |

(52) U.S. Cl.
CPC .......... *G06F 40/117* (2020.01); *G06F 3/0482* (2013.01); *G06F 3/04845* (2013.01); *G06F 3/04847* (2013.01); *G06F 16/958* (2019.01); *G06F 40/106* (2020.01); *G06F 40/143* (2020.01)

(58) Field of Classification Search
None
See application file for complete search history.

(56) References Cited

U.S. PATENT DOCUMENTS

| | | | | |
|---|---|---|---|---|
| 8,615,708 | B1 * | 12/2013 | Hidayat | G06F 40/143 715/236 |
| 9,483,259 | B1 * | 11/2016 | Lee | G06F 8/70 |
| 2002/0165881 | A1 * | 11/2002 | Shelton | G06F 3/14 715/275 |
| 2012/0066304 | A1 * | 3/2012 | Marmon | H04W 4/50 709/204 |
| 2016/0299642 | A1 * | 10/2016 | Esterly | G06F 3/0482 |
| 2017/0109136 | A1 * | 4/2017 | Colle | G06F 8/20 |
| 2017/0302549 | A1 * | 10/2017 | Han | H04L 67/02 |
| 2023/0004259 | A1 * | 1/2023 | Song | G06F 3/0482 |

* cited by examiner

*Primary Examiner* — Matthew Ell
*Assistant Examiner* — Gabriel Mercado
(74) *Attorney, Agent, or Firm* — Rowan TELS LLC

(57) ABSTRACT

Disclosed are a method for real-time dynamic web page display enhancement and a computing apparatus configured to implement said method. The method includes requesting at least one web page code file using a web browser, extracting the at least one style tag and the at least one variable attribute from the at least one web page code file using an extraction module, sending a request signal from the extraction module to an attribute database, returning from the attribute database to a user interface controller a response signal, sending a present user interface signal from the user interface controller to the web browser, accepting at least one selection signal from the web user through the at least one display control of the user interface to the web browser, and generating an enhanced web page.

20 Claims, 9 Drawing Sheets

```
<!DOCTYPE html>

<html>

<body max-width: 400px;
      style="background-color:#000000">

<h1 style="font-size:30px; color:#888888;
  font-family:arial">Article Title</h1>

<p>Body text body text body text</p>

<img src="logo.jpg" alt="company.com"
  width="104" height="142">

<svg width="100" height="100"> <circle
      cx="50" cy="50" r="40" fill="red"/>
  </svg>

</body>

</html>
```

FIG. 3

FINE-GRAINED CONTROL OF VISUAL DISPLAY AND SCALING ATTRIBUTES

BACKGROUND

Visual interfaces on computers and mobile devices often juxtapose and/or overlay text with graphical elements. Often, and especially when these elements may shift position dynamically based on context, screen size, and device type, the text and graphical elements compete with one another for visual prominence. This may hinder the user from effectively perceiving the information they want.

Most modern browsers offer the ability to zoom in and out (see FIG. 1A and FIG. 1B). However the results of such zooming may rearrange the visual elements into unappealing or less convenient formats. Safari offers a "reading" version that alters all text. Dark mode exists as an alternative viewing style. Showing and hiding data as well as expanding and collapsing elements is a common convention used for tables. However, there is a need to provide users with more fine-grained and personalized control over how text and graphical elements compete for visual prominence.

BRIEF SUMMARY

The present disclosure relates to a method for real-time dynamic web page display enhancement and a computing apparatus configured to implement said method. The method includes requesting at least one web page code file using a web browser, where the at least one web page code file contains at least one page element having at least one style tag with at least one variable attribute assigned a default attribute value. The method further includes extracting the at least one style tag and the at least one variable attribute from the at least one web page code file using an extraction module. The method proceeds by sending a request signal from the extraction module to an attribute database, where the request signal includes the at least one style tag and the at least one variable attribute to be used as search parameters in the attribute database. The method further includes returning from the attribute database to a user interface controller a response signal, where the response signal includes at least one label associated with the at least one style tag and at least one display control that selectively presents at least one compatible range of attribute values associated with the at least one variable attribute. The method also includes sending a present user interface signal from the user interface controller to the web browser, where the present user interface signal instructs the web browser to generate and display to a web user a user interface includes the at least one label and the at least one display control. The method then includes accepting at least one selection signal from the web user through the at least one display control of the user interface to the web browser, where the at least one selection signal corresponds to a selection by the web user of at least one selected attribute value from among the at least one compatible range of attribute values. Finally, the method includes generating an enhanced web page, where the at least one selection signal instructs the web browser to compile the at least one web page code file using the at least one selected attribute value in place of the default attribute value for the at least one variable attribute of the at least one style tag, such that the enhanced web page is displayed with the at least one page element appearing as having the at least one selected attribute value.

The computing apparatus disclosed herein comprises a processor and a memory having instructions that, when executed by the processor, configure the apparatus to perform the method described above.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates exemplary web page code files 300 containing code tag elements in a conventional web coding protocol.

DETAILED DESCRIPTION

Figure 1B:
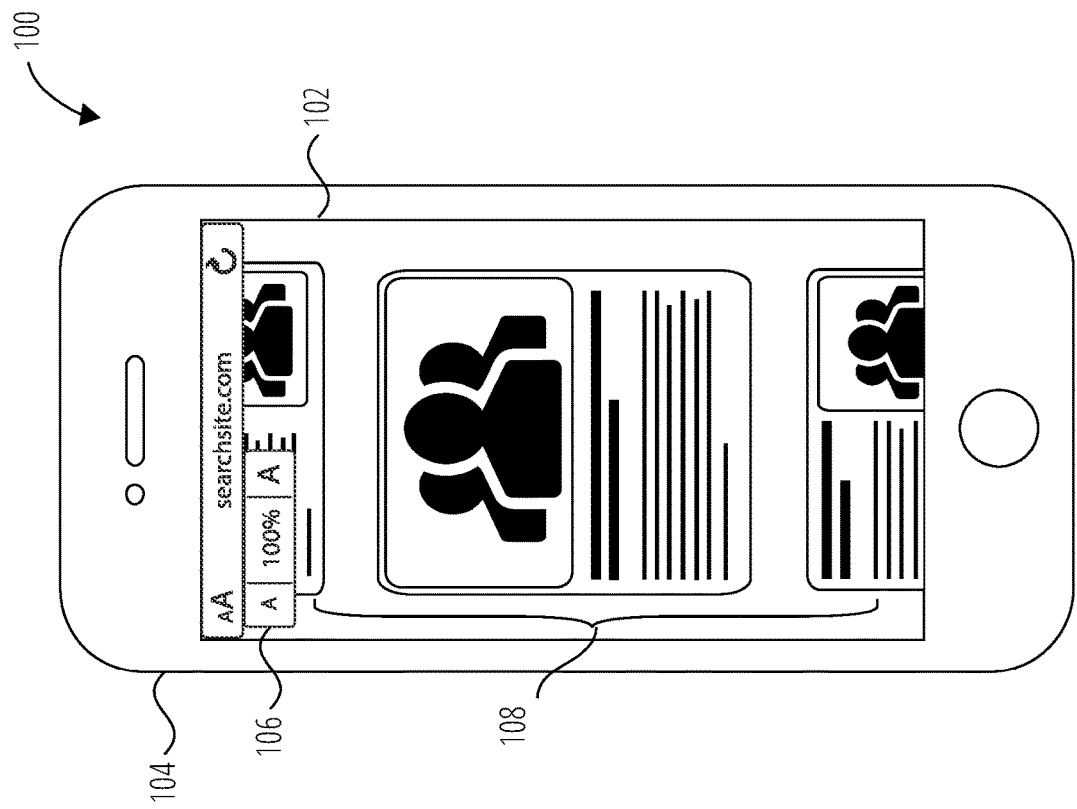
FIG. 1A and FIG. 1B depict a conventional approach 100 to scaling of text and images in a web browser.

Disclosed herein are systems and mechanisms to enable fine-grained end-user or administrative control over display and scaling attributes of text and graphical elements, for example in a web browser. Individual control may be provided over the relative scaling of a hierarchy of textual elements, as well as images, both in absolute terms and relative to one another.

In the following description of exemplary embodiments, reference may be made to the following terms. Other terms may be accorded their ordinary meaning in the art unless otherwise indicated by context. A user interface: is an operable display of text and/or graphical elements that a computing device user interacts with. Hypertext Markup Language (HTML) is a well-known and prevalent markup language for designing webpages. Cascading style sheets (CSS) is a programming language used to style an HTML document, and describes how HTML elements may be displayed. JavaScript is a well-known and prevalent programming language for web sites and web pages.

HTML elements are delimited using tags. The element includes the content between a start tag and an end tag, e.g., <tagname> Content in element </tagname>. HTML attributes attributes define additional features of HTML elements and are specified in the start tag. HTML headings are titles or subtitles displayed on a webpage. Headings are defined with <h1> to <h6> tags (where <h1> is highest-level heading type, and <h6> is the lowest-level heading type). An HTML style is an attribute that styles an element, such as color, font, size, etc. HTML styles comprise a property and a value and may be defined via CSS.

When navigating a user interface providing real-time dynamic web page display enhancement, as disclosed herein, a user may manipulate the output of elements of the web page, such as the heading page elements, body text page elements, image page elements, etc., by manually adjusting or replacing the corresponding attributes, headings, and styles associated with the specific elements being displayed, in effect dynamically modifying the HTML, CSS, or other code attributes specified in web page code files stored on the internet that control how a web page is displayed by a web browser.

This may be accomplished through an auxiliary user interface that includes controls to dynamically adjust how elements are displayed on the output by identifying the attributes of the style tags of page elements displayed, intercepting the existing attribute values, and instead displaying a value corresponding to the user's indicated selections from the user interface. This may be used across multiple interfaces where several layers of information are displayed/overlaid, e.g., system diagrams, blueprints, maps, schematics, etc.

The benefit to the disclosed solution is that it allows for clarity of understanding to the user, a better experience in navigating potentially cluttered or confusing data, and a path to improving how information is displayed. Because this may be used across multiple interfaces, and there is a clear increase in the occurrence of multi-layered visual elements in everyday life, this may provide a more deliberate approach to consuming interfaces based on the contextual need for the user.

Figure 1A:
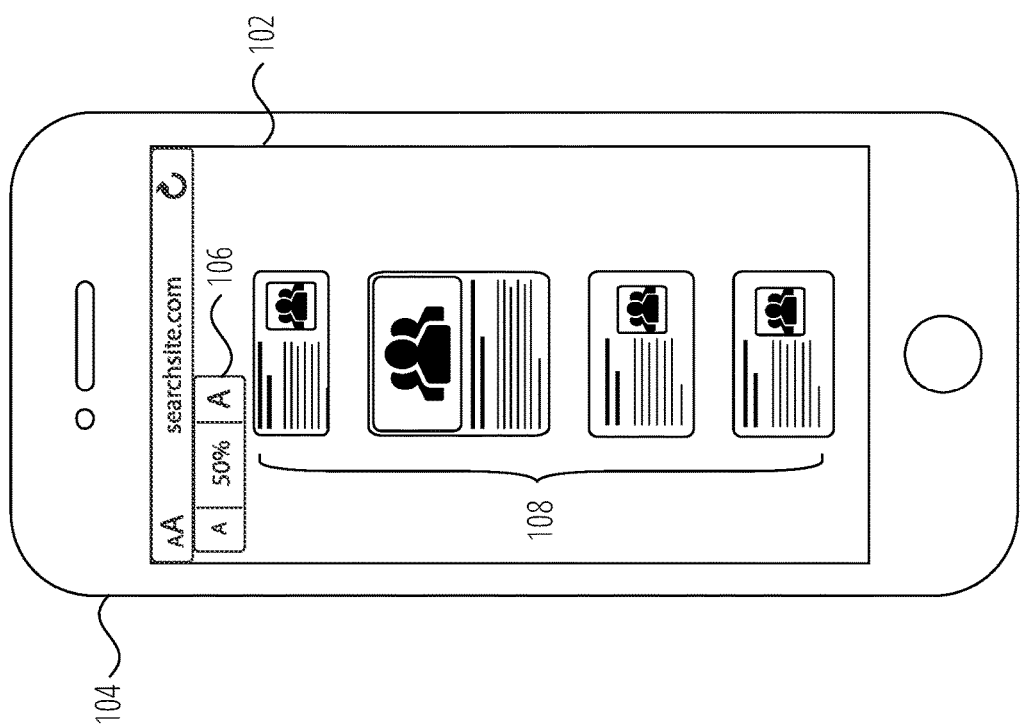

FIG. 1A and FIG. 1B illustrate a conventional approach 100 to customizing web page display. A conventional approach 100 may include a web browser 102 installed on a display device 104, the web browser 102 implementing a size selector 106 and displaying web page contents 108. Such an approach may allow a user of the display device 104 to tap to select the size selector 106, and further tap options within the size selector 106 to increase and decrease the font size of text within the web page contents 108. Such a size selector 106 may be configured as a zoom control that enlarges not just the font but all elements of the web page contents 108 displayed on the display device 104.

FIG. 1A illustrates how a web browser 102 may display web page contents 108 on the display device 104 at a "50%" setting. A web user may use the size selector 106 to adjust up to a 100% setting, enlarging the web page contents 108 as shown in FIG. 1B. This conventional approach 100 is limited in that the size and no other attributes of web page contents 108 may be controlled, and all content types within the web page contents 108 may be treated similarly. Other approaches implemented in conventional web browser applications are similarly limited.

Figure 2:
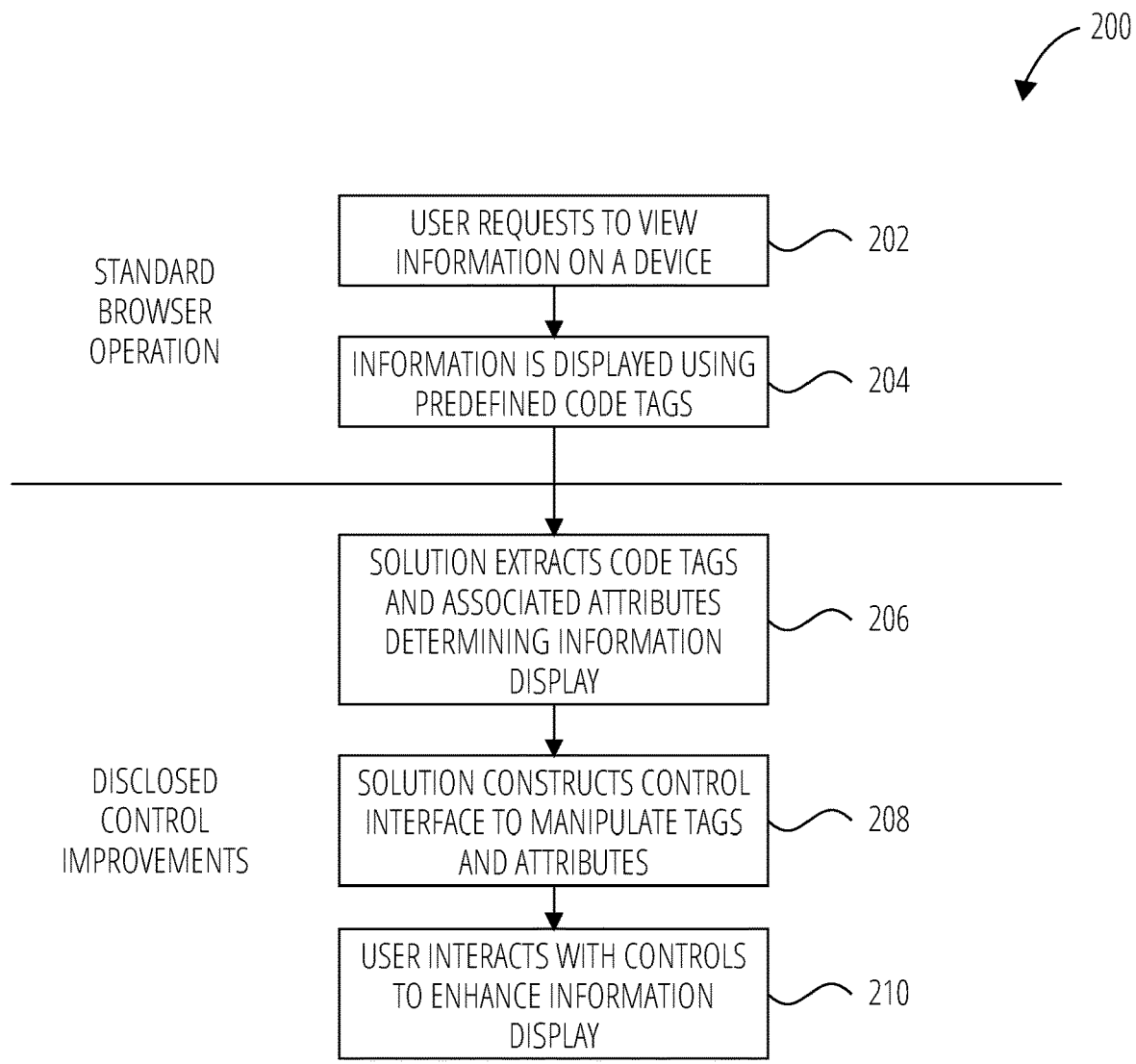
FIG. 2 illustrates a process 200 in accordance with one embodiment.

FIG. 2 illustrates a process 200 in accordance with one embodiment of the disclosed solution. At block 202, a user requests to view information on a device, such as the web page contents 108 displayed in the web browser 102 of the display device 104 described with respect to FIG. 1A and FIG. 1B. The information may be displayed using predefined code tags in block 204. Examples of predefined code tags are described with respect to FIG. 3 below. These steps of the process 200 may be incorporated in standard web browser operation, following the conventional approach 100 previously discussed.

In the disclosed solution, control improvements may be implemented in the subsequent illustrated steps. At block 206, the disclosed solution may extract code tags and the attributes associated with them that determine how information is displayed. At block 208, the solution may construct a control interface where the user may have the ability to select and manipulate tags and their attributes. This allows the user to interact with the controls of the control interface at block 210 to dynamically and selectively enhance how the information is displayed to them on their device. The novel steps of this process 200 are described in greater detail with respect to the routine 400 of FIG. 4 below.

FIG. 3 illustrates exemplary web page code files 300 containing code tag elements in a conventional web coding protocol. The web page code files 300 may comprise page elements 302a through page element 302d, style tags 304a through style tag 304d, a variable attribute 306 having a default attribute value 308, page attributes 310 including page size display data 312, an anticipated page size 314, and a page background color 316, text attributes 318 including a text size 320, and a text color 322, image attributes 324 such as an image size 326, and vector graphic attributes 328 including a vector graphic size 330, and a vector graphic color 332.

In this example, the web page represented by these web page code files 300 may be encoded using HTML code. Page elements such as the page title (page element 302a), the text of the page body (page element 302b), an image accompanying the page text (page element 302c) and a scalable vector graphic (SVG) element, such as a circle shape (page element 302d) may be defined within the web page code files 300, and may control what a web browser displays to a web user after parsing the web page code files 300. The style tags 304a-304d and the attributes defined within them control how the web browser displays these elements.

For example, page attributes 310 may be defined in a body style tag. Page attributes 310 may include page size display data 312, such as the anticipated page size 314 of 400 px maximum width, and the page background color 316, shown to be black (corresponding to the six-digit hexadecimal code #000000). A heading 1 style tag 304a may then be applied to the title page element 302a, and may include a variable attribute 306 controlling text size that is assigned the default attribute value 308 of 30 px. Text attributes 318 may include text size 320, text color 322, and other attributes such as font family, font face, etc.

In one embodiment, a paragraph style tag 304b may indicate that body text is to be displayed using a default paragraph style. Display attributes of this style may be determined using default values coded into a web browser, or they may be controlled by styles defined in a separate CSS file.

Image attributes 324 included in image style tag 304c may determine the web location of the image to be displayed, such as the source attribute given for page element 302c. These attributes may include image size 326, alternate text intended for display where images are omitted for bandwidths reasons or where source links are broken, and other attributes used in displaying an image file. Vector graphic attributes 328 such as the vector graphic size 330 and vector graphic color 332 to be applied to the circle page element 302a.

The web page code files 300 illustrated and described here represent a small example set of the types of page elements, style tags, and attributes that may be assigned to them, and the coding protocols that may be used.

Figure 4:
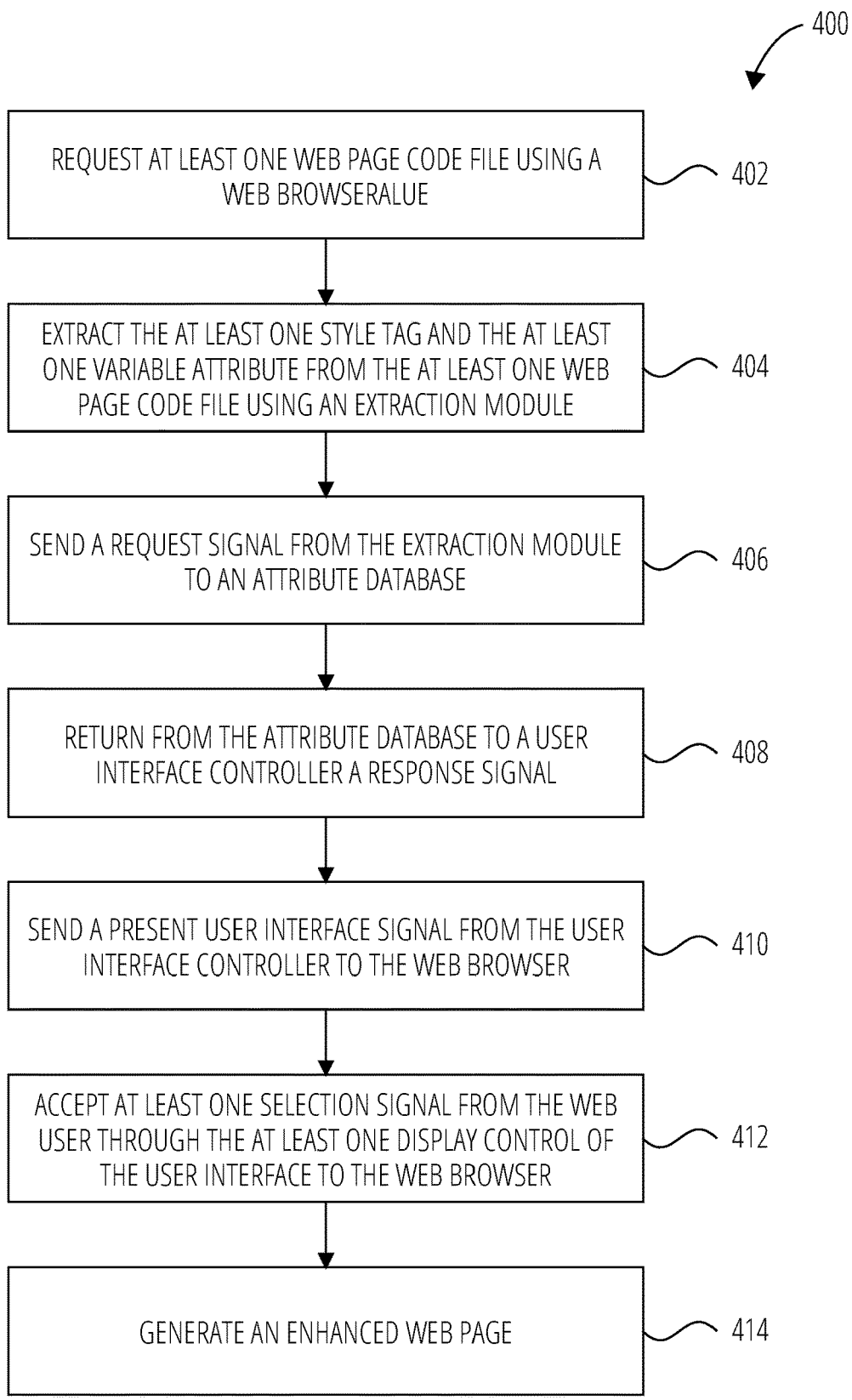
FIG. 4 illustrates a routine 400 in accordance with one embodiment.

FIG. 4 illustrates a routine 400 in accordance with one embodiment. In block 402, at least one web page code file may be requested using a web browser. The web browser may be a web browser installed on a laptop, a mobile phone, or some other user device having a display or monitor to provide visual output to a web user. The web page code file or files may contain at least one page element having at least one style tag with at least one variable attribute assigned a default attribute value. For example, the web page code file may have a title page element having a heading 1 style tag.

A text size attribute may have the default attribute value of 30 px assigned, such as was illustrated in FIG. 3. The text size attribute may be considered a variable attribute in that other sizes than 30 px are valid for that attribute according to the coding protocol used.

In block 404, an extraction module may extract the style tags and the their variable attributes may be extracted from the web page code files. In this manner, the disclosed solution may detect, tabulate, or otherwise gather insight into what types of elements are contained in the web page and how the web browser is instructed by the web page code files to display these elements.

In block 406, the extraction module may send a request signal to an attribute database. The request signal may include the extracted style tags and variable attributes to be used as search parameters within in the attribute database. In block 408, the attribute database may return a response signal to a user interface controller. The response signal may include labels associated with the style tags, such as "Title Size" for a font-size attribute applied in a style tag for a page title, "Body Text Color" for the font color attribute found in a style tag controlling generic text in the body of the webpage, etc. The response signal may also include display controls that selectively present a compatible range of attribute values associated each variable attribute extracted. For example, an "Image Size" display control may present a range of page widths from 10% to 100%, indicating that images in the web page may be displayed as taking 10% to 100% of the width of the page as displayed.

In block 410, the user interface controller may send a present user interface signal to the web browser. This present user interface signal may instruct the web browser to generate and display to a web user a user interface comprising the labels and display controls determined as previously described. In this manner, the web browser may present to a web user a user interface where the web user may dynamically control and customize how web pages are displayed in their device.

In block 412, the web user may interact with the display controls of the user interface to generate at least one selection signal, which is sent to the web browser. This selection signal may correspond to a selection by the web user of one or more selected attribute values from among the compatible ranges of attribute values presented by the user interface. For example, a user may select an image size of 20% page width, a body text size of 12 px, a title color corresponding to dark blue, a circle element color corresponding to green, etc.

In block 414, the web browser may generate an enhanced web page for display to the web user. The at least one selection signal may instruct the web browser to compile the web page code files controlling the page to be displayed using the selected attribute values determined by web user interaction with the user interface in place of the default attribute values encoded for the variable attributes of the style tags in the web page code files as written. In this manner, the enhanced web page is displayed with the page elements appearing as having the selected attribute values indicated by the user, instead of their default attribute values.

In one embodiment, the web browser may be instructed to display a user interface access icon. The web user may interact with the user interface access icon, thereby sending an access signal to the user interface controller. The access signal may instruct the user interface controller to send the present user interface signal to the web browser, instructing the web browser to present the user interface to the web user.

In one embodiment, the attribute database may include a plurality of curated compatible ranges of attribute values. The attribute database may return the at least one display control associated with at least one of the plurality of curated compatible ranges of attribute values based on predefined selection rules.

In one embodiment, the plurality of curated compatible ranges of attribute values comprise predefined attribute value ranges curated to provide at least one of variations of common default attribute values, improved bandwidth performance, selective interactive graphical interface feature enhancement, high visibility contrast, improved dark-mode visibility, conversion to a colorblind-friendly color palette, text magnification, image magnification, and web page decluttering. These variations may include attribute definitions as are well understood in the art, such as removing images, displaying image alternate text instead, adjusting colors for multiple page elements when red and green are used to differentiate types of information, increasing all font sizes proportionally across multiple web page text elements, etc.

In one embodiment, page size display data indicating an anticipated page size may be extracted using the extraction module from at least one of the at least one web page code file, the web browser, and a device having the web browser installed. The request signal sent to the attribute database may further include the page size display data, which may be used to filter the plurality of curated compatible ranges of attribute values to a filtered set of compatible ranges of attribute values compatible with the anticipated page size, and returning the at least one display control associated with the at least one compatible range of attribute values selected from among the filtered set of compatible ranges of attribute values. In this manner, smaller font sizes may be offered for selection when a user is using a web browser on a smart phone than may be offered when a user is browsing on a device having a large monitor.

In one embodiment, the extraction module may extract the default attribute value assigned to the at least one variable attribute of the at least one style tag from the at least one web page code file. The request signal sent to the attribute database may then include the default attribute value, and the default attribute value may be included in the search parameters used in the attribute database, dynamically generating at the attribute database at least one custom compatible range of attribute values based on at least one of comparison with the default attribute value and transformation of the default attribute value, and returning the at least one display control associated with the custom compatible range of attribute values. For example, a default body text size of 12 px may be used to generate a custom compatible range of attribute values of 8 px to 18 px, and heading text sizes offered for heading elements may have a minimum size of 22 px, ensuring that headings are more immediately visible than body text.

In one embodiment, the default attribute value may be included in the custom compatible range of attribute values. The at least one display control may offer the default attribute value as an initially selected option to the web user.

In one embodiment, the at least one display control may be a sliding scale control selectably presenting the at least one compatible range of attribute values at positions along a linear scale for selection by the web user (e.g., a slider for increasing and decreasing font size), a selection panel presenting the at least one compatible range of attribute values as an array of options for selection by the web user (e.g., a panel of color swatches), or a check box presenting the at least one compatible range of attribute values for enablement and disablement by the web user.

In one embodiment, the extraction module may parse the at least one web page code file for at least one of page attributes, text attributes, image attributes, and vector graphic attributes. In one embodiment, the at least one display control may offer the web user options to modify at least one of text size, text color, page background color, image size, image visibility, vector graphic size, and vector graphic color. Other technical features may be readily apparent to one skilled in the art from the following figures, descriptions, and claims.

Figure 5:
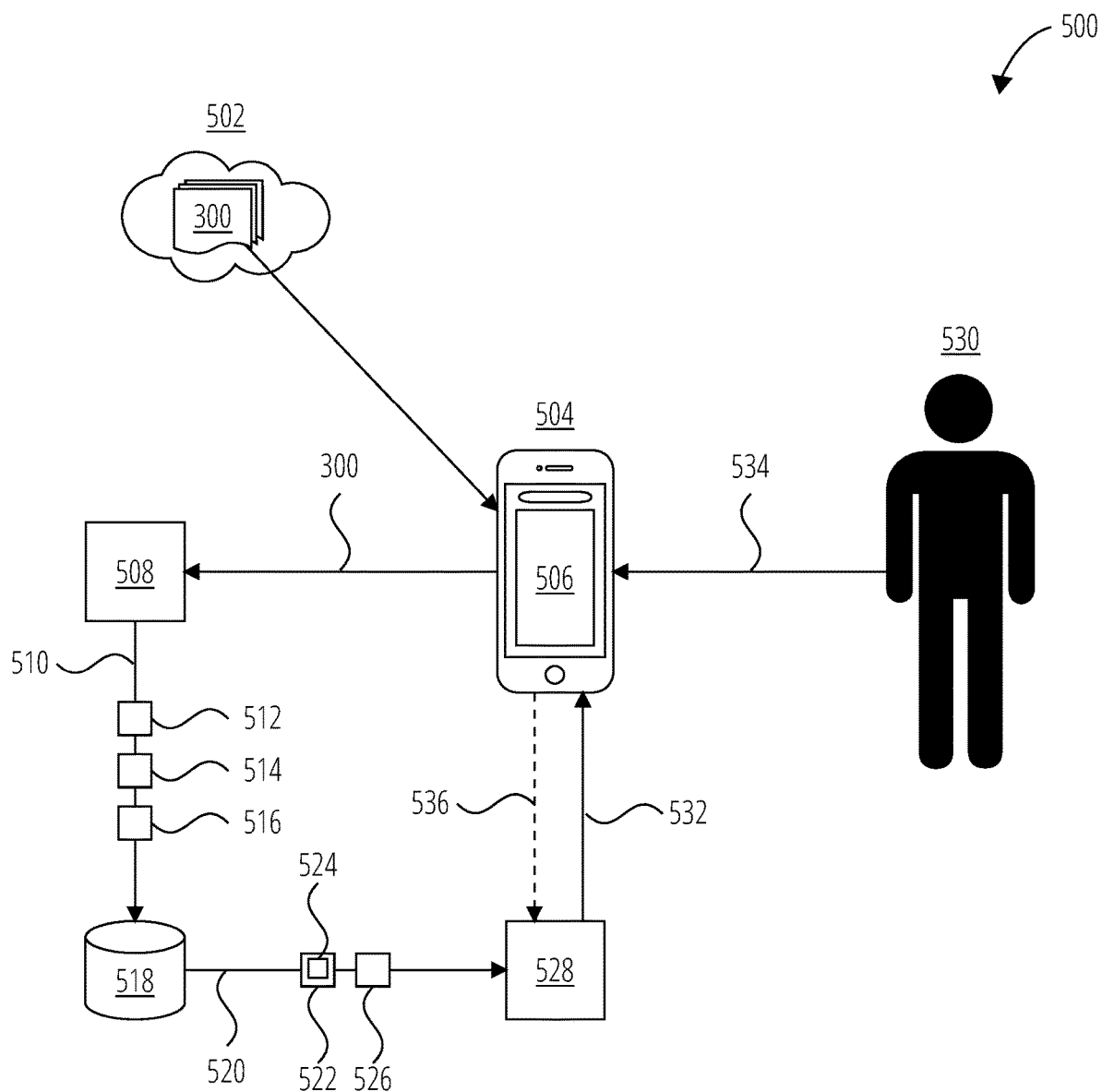
FIG. 5 illustrates a system 500 utilizing the visual display and scaling attributes in accordance with one embodiment.
Figure 6:
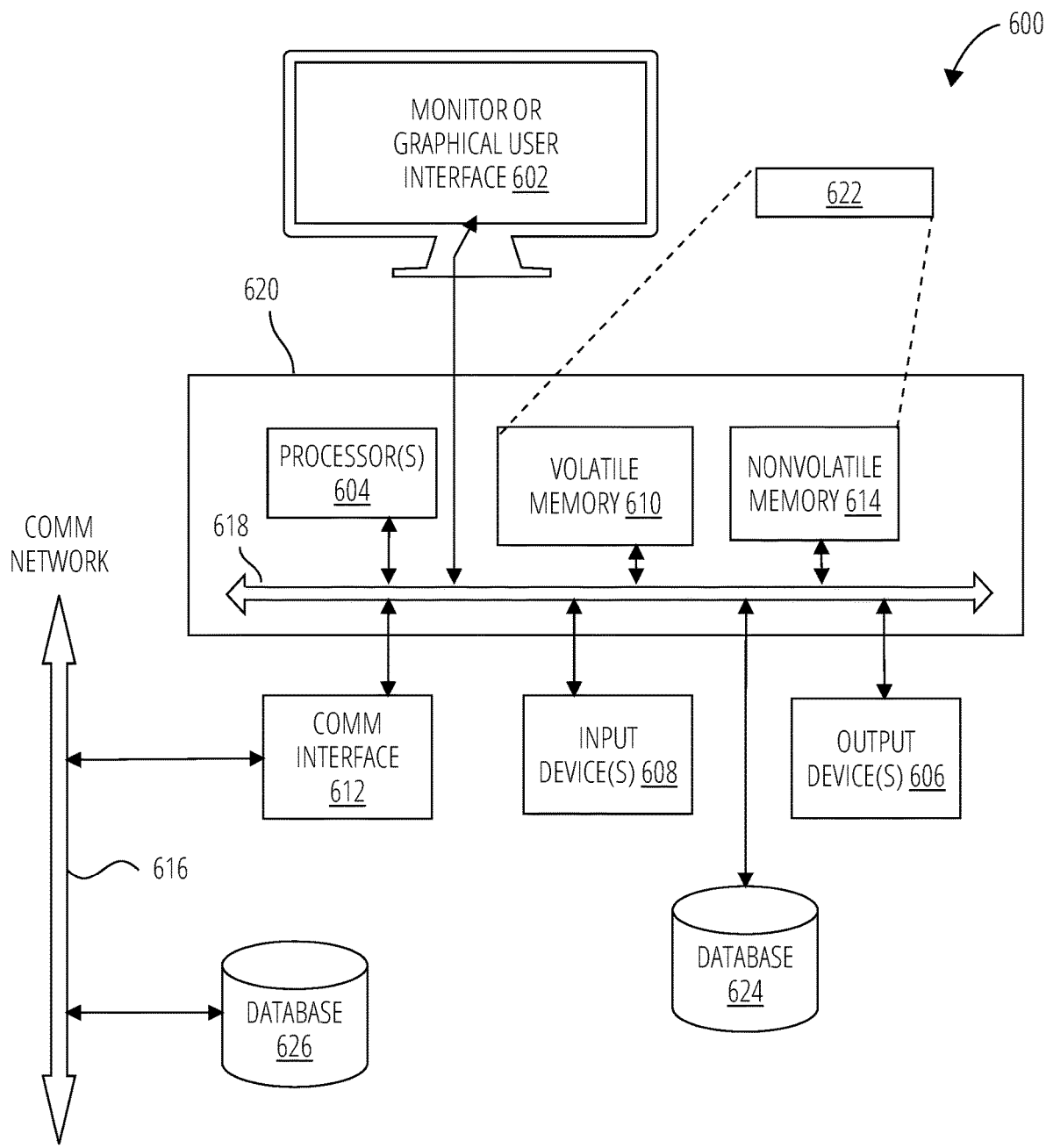
FIG. 6 is an example block diagram of a computing device 600 that may incorporate embodiments of the present disclosure.

FIG. 5 illustrates a system 500 in accordance with one embodiment. The system 500 may be embodied by a computing device 600 as illustrated in FIG. 6, such as a computer or mobile phone. The system 500 may be configured to perform the routine 400 disclosed herein, described with respect to FIG. 4. The system 500 may comprise web page code files 300, an Internet 502, a device 504, a web browser 506, an extraction module 508, a request signal 510, style tags and variable attributes 512, default attribute values 514, page size display data 516, an attribute database 518, a response signal 520, labels and display controls 522, user interface display parameters 526, a user interface controller 528, a web user 530, a present user interface signal 532, selection signals 534, and an access signal 536.

Using this system 500, the web user 530 may wish to display a web page on their device 504. The device 504 may request web page code files 300 for the web page over the Internet 502 through the action of the web browser 506. The web page code files 300 may contain page elements having style tags that include variable attributes that are assigned default attribute values.

The web page code files 300 may be analyzed with an extraction module 508 that may be configured to detect and extract elements of the web page code files 300, which may include style tags and variable attributes 512, default attribute values 514, and page size display data 516. The extraction module 508 may be configured to send a request signal 510 to an attribute database 518. The request signal 510 may include the style tags and variable attributes 512, default attribute values 514, and page size display data 516, which may be used as search parameters in the attribute database 518. For example, default attribute values 514 and page size display data 516 may be used to determine appropriate ranges of alternative values that might be applied to page elements without conflicting with other styled elements displayed on the web page, or exceed the display space available.

The attribute database 518 may return a response signal 520 to a user interface controller 528. The response signal 520 may include labels and display controls 522 and user interface display parameters 526. The labels may correspond to style tags found in the web page code files 300. The display controls may selectively present compatible ranges of attribute values 524 associated with the variable attributes of those extracted style tags. For example, a heading 1 style tag extracted from the web page code files 300 may result in a "Headings" label and display controls associated with font color and font size. The user interface display parameters 526 may further instruct the user interface controller 528 on how to configure the arrangement of features of a user interface based on the types of style tags and attributes analyzed and the labels and compatible ranges of attribute values returned by the attribute database 518.

The user interface controller 528 may send a present user interface signal 532 to the web browser 506. The present user interface signal 532 may instruct the web user 530 to generate and display to the web user 530 a user interface comprising the labels and display controls 522, as indicated by the user interface display parameters 526. For example, the user interface controller 528 may instruct the web browser 506 to present a user interface allowing a user to change body text size using a linear scaling bar, to change heading text color by selecting from an array of color options, such as a swatch panel, and to turn off images and display alternate text using a checkbox.

The web user 530 may generate selection signals 534 through their interaction with the display controls of the user interface, such as tapping or swiping a touch screen, issuing voice to text commands, scrolling and selecting using arrow and Enter keys, or other forms of user input to computing interfaces, as are well understood in the art. The selection signals 534 may correspond to a selection by the web user 530 of one or more selected attribute values from among the compatible range of attribute values presented through the user interface. In response, the web browser 506 may be configured to generate an enhanced web page. The selection signals 534 may instruct the web browser 506 to compile the web page code files 300 using the selected attribute values in place of the default attribute values for the variable attributes of the style tags, such that the enhanced web page is displayed with the pages page elements appearing as having the selected attribute values instead of the default attribute values.

In one embodiment, the web browser 506 may be instructed to display a user interface access icon. On condition that the web user 530 interacts with (e.g., taps, clicks, selects) the user interface access icon, the web browser 506 may send an access signal 536 to the user interface controller 528. The access signal 536 may instruct the user interface controller 528 to send the present user interface signal 532 to the web browser 506.

FIG. 6 is an example block diagram of a computing device 600 that may incorporate embodiments of the present disclosure. Such a computing device 600 may comprise elements described with respect to FIG. 5, and may complete the routine 400 illustrated in FIG. 4. FIG. 6 is merely illustrative of a machine system to carry out aspects of the technical processes described herein, and does not limit the scope of the claims. One of ordinary skill in the art would recognize other variations, modifications, and alternatives. In one embodiment, the computing device 600 typically includes a monitor or graphical user interface 602, a data processing system 620, a communication network interface 612, input device(s) 608, output device(s) 606, and the like.

As depicted in FIG. 6, the data processing system 620 may include one or more processor(s) 604 that communicate with a number of peripheral devices via a bus subsystem 618. These peripheral devices may include input device(s) 608, output device(s) 606, communication network interface 612, and a storage subsystem, such as a volatile memory 610 and a nonvolatile memory 614.

The volatile memory 610 and/or the nonvolatile memory 614 may store computer-executable instructions and thus forming instructions 622 that when applied to and executed by the processor(s) 604 implement embodiments of the processes disclosed herein.

The input device(s) 608 include devices and mechanisms for inputting information to the data processing system 620. These may include a keyboard, a keypad, a touch screen incorporated into the monitor or graphical user interface 602, audio input devices such as voice recognition systems, microphones, and other types of input devices. In various embodiments, the input device(s) 608 may be embodied as a computer mouse, a trackball, a track pad, a joystick, wireless remote, drawing tablet, voice command system, eye tracking system, and the like. The input device(s) 608 typically allow a user to select objects, icons, control areas, text and the like that appear on the monitor or graphical user interface 602 via a command such as a click of a button or the like.

The output device(s) 606 include devices and mechanisms for outputting information from the data processing system 620. These may include the monitor or graphical user interface 602, speakers, printers, infrared light emitting diodes (LEDs), and so on as well understood in the art.

The communication network interface 612 provides an interface to communication networks (e.g., communication network 616) and devices external to the data processing system 620. The communication network interface 612 may serve as an interface for receiving data from and transmitting data to other systems. Embodiments of the communication network interface 612 may include an Ethernet interface, a modem (telephone, satellite, cable, integrated services digital network or ISDN), (asynchronous) digital subscriber line (DSL), FireWire, USB, a wireless communication interface such as BlueTooth or WiFi, a near field communication wireless interface, a cellular interface, and the like.

The communication network interface 612 may be coupled to the communication network 616 via an antenna, a cable, or the like. In some embodiments, the communication network interface 612 may be physically integrated on a circuit board of the data processing system 620, or in some cases may be implemented in software or firmware, such as "soft modems", or the like.

The computing device 600 may include logic that enables communications over a network using protocols such as HTTP, TCP/IP, RTP/RTSP, IPX, UDP and the like.

The volatile memory 610 and the nonvolatile memory 614 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 610 and the nonvolatile memory 614 may be configured to store the basic programming and data constructs that provide the functionality of the disclosed processes and other embodiments thereof that fall within the scope of the present disclosure.

Memory may also include a database 624. In some embodiments, the computing device 600 may additionally or alternatively communicate with a database 626 via communication network 616, a storage area network ("SAN"), a high-speed serial bus, and/or via the other suitable communication technology.

In some embodiments, database 626 may comprise one or more storage resources provisioned from a "cloud storage" provider, for example, Amazon Simple Storage Service ("Amazon S3"), provided by Amazon.com, Inc. of Seattle, Washington, Google Cloud Storage, provided by Google, Inc. of Mountain View, California, and the like.

Instructions 622 that implement embodiments of the present disclosure may be stored in the volatile memory 610 and/or the nonvolatile memory 614. Said instructions 622 may be read from the volatile memory 610 and/or nonvolatile memory 614 and executed by the processor(s) 604. The volatile memory 610 and the nonvolatile memory 614 may also provide a repository for storing data used by the instructions 622.

The volatile memory 610 and the nonvolatile memory 614 may include a number of memories including a main random access memory (RAM) for storage of instructions and data during program execution and a read only memory (ROM) in which read-only non-transitory instructions are stored. The volatile memory 610 and the nonvolatile memory 614 may include a file storage subsystem providing persistent (non-volatile) storage for program and data files. The volatile memory 610 and the nonvolatile memory 614 may include removable storage systems, such as removable flash memory.

The bus subsystem 618 provides a mechanism for enabling the various components and subsystems of data processing system 620 communicate with each other as intended. Although the communication network interface 612 is depicted schematically as a single bus, some embodiments of the bus subsystem 618 may utilize multiple distinct busses.

It will be readily apparent to one of ordinary skill in the art that the computing device 600 may be a device such as a smartphone, a desktop computer, a laptop computer, a rack-mounted computer system, a computer server, or a tablet computer device. As commonly known in the art, the computing device 600 may be implemented as a collection of multiple networked computing devices. Further, the computing device 600 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g., read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Figures 7A, 7B, 7C:
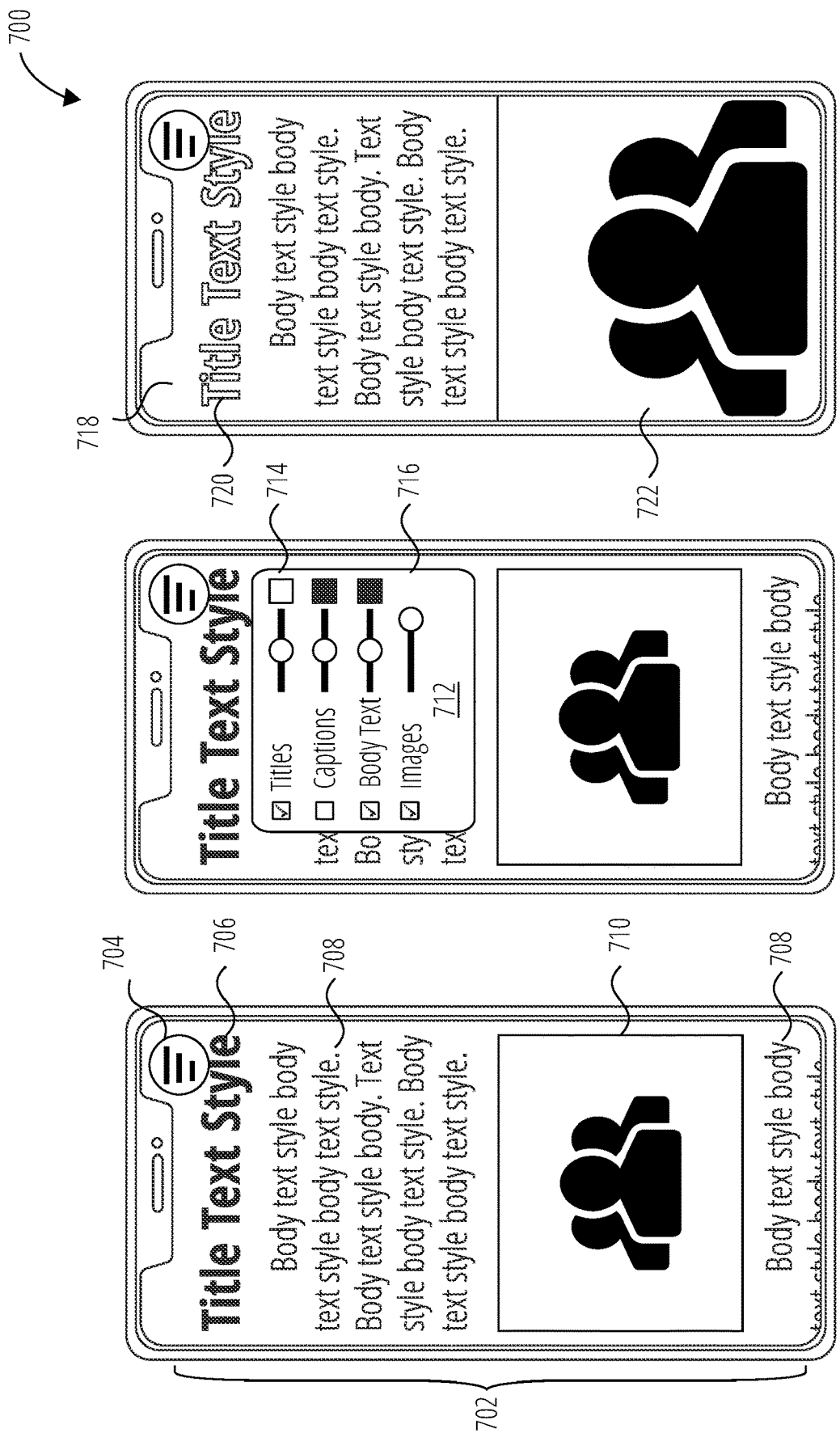
FIG. 7A-FIG. 7F illustrate adjusting web article elements 700 in accordance with one embodiment.

FIG. 7A-FIG. 7F illustrate adjusting web article elements 700 in accordance with one embodiment. A web page 702 is shown as it may be displayed on a smartphone device, such as the display device 104 and device 504 previously introduced. A user interface access icon 704 may be displayed by the web browser along with the web page 702. The web page 702 may include a heading page element 706, body text page elements 708, and an image page element 710 among its page elements, as shown in FIG. 7A.

When navigating a user interface providing real-time dynamic web page display enhancement, as disclosed herein, a user may manipulate the output of elements of the web page 702, such as the heading page element 706, body text page element 708, image page element 710, and other page elements, by manually adjusting or replacing the corresponding attributes, headings, and style associated with specific elements being displayed.

FIG. 7B illustrates such a user interface 712 that may be displayed by the web browser when configured by the user interface controller, such as is described with respect to the user interface controller 528 of FIG. 5. The user interface 712 may include title display controls 714 such as a checkbox indicating that titles (i.e., heading page elements 706) are to be displayed, along with a slider allowing a user to change the font size of titles and a color box that may open a swatch panel when tapped, allowing a user to change the font color of titles. The user interface 712 may also include image display controls 716. These may include a checkbox indicating that images are to be displayed, and a slider allowing the user to increase or decrease the size at which images are displayed. In the illustrated example, a user may interact with the user interface 712 to change the color of titles on the displayed page, and to increase the image size.

FIG. 7C illustrates enhanced web page 718 exhibiting the adjusted title page element 720 and adjusted image page element 722, as they may appear after a user has made the adjustments indicated in the user interface 712 of FIG. 7B. The title text may be changed to white and the image adjusted to take up a greater screen-width than these elements are assigned by default, as illustrated in FIG. 7A.

Figure 7F:
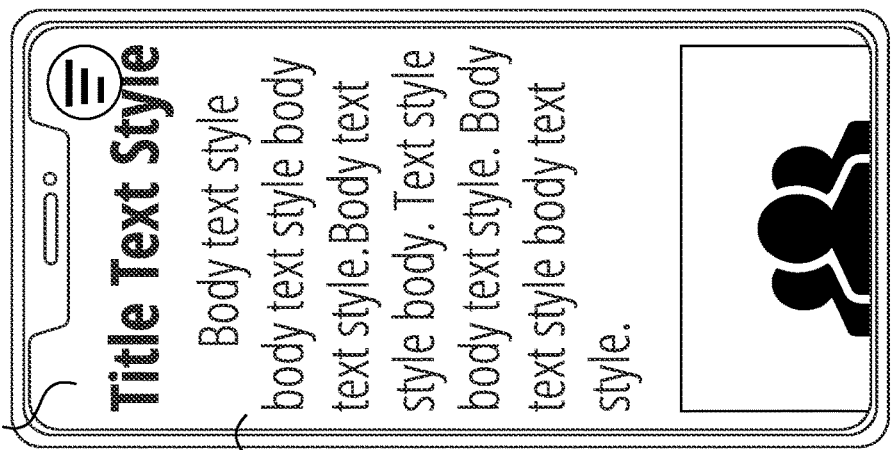
Figure 7E:
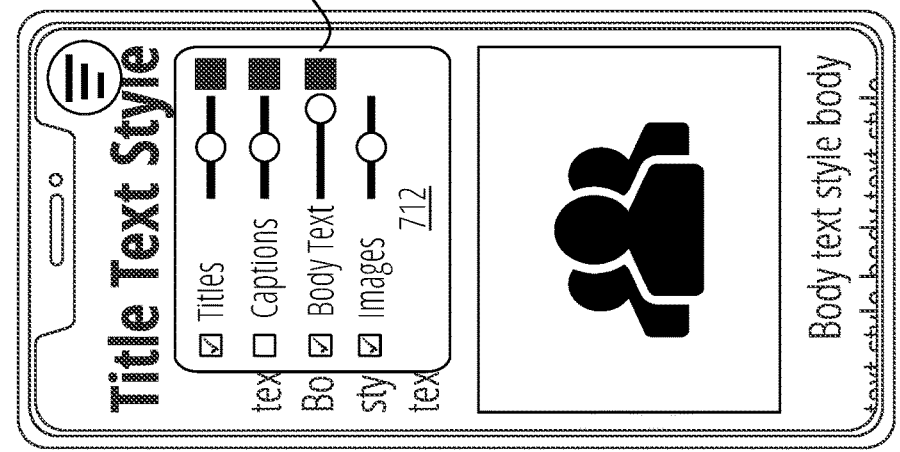
Figure 7D:
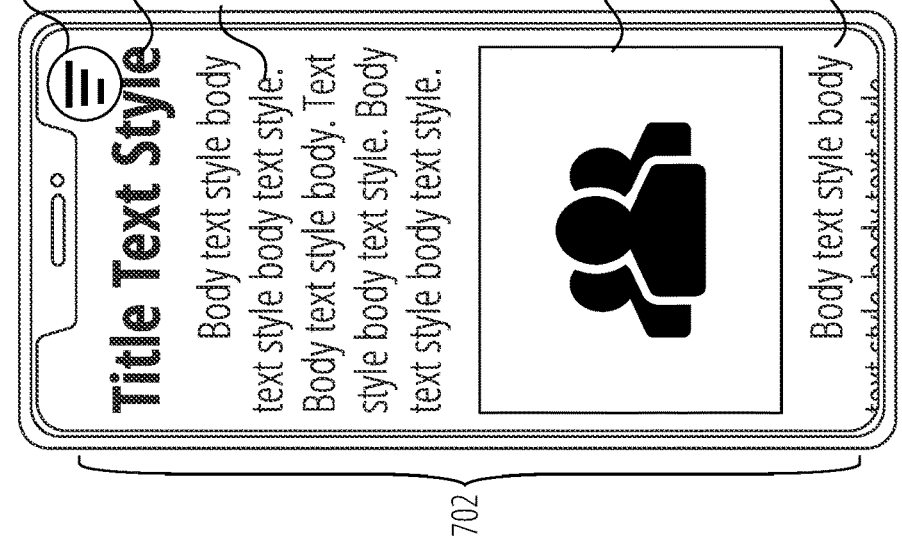

FIG. 7D illustrates the same web page 702, user interface access icon 704, heading page element 706, body text page element 708, and image page element 710 as FIG. 7A. The web page 702 may be displayed using the default attribute values assigned to the variable attributes indicated in the style tags for its various page elements.

The user interface 712 of FIG. 7B is shown again in FIG. 7E, with body text display controls 724 indicated. The body text display controls 724 may include a checkbox indicating that body text page elements 708 are to be displayed, a slider to increase or decrease body text size, and a box that, when tapped, may present a swatch panel allowing the user to change body text color.

In FIG. 7F, the enhanced web page 718 is displayed with adjusted body text page elements 726, as it may appear with the body text page element 708 text size increased as shown in the user interface 712 of FIG. 7E.

Figure 8C:
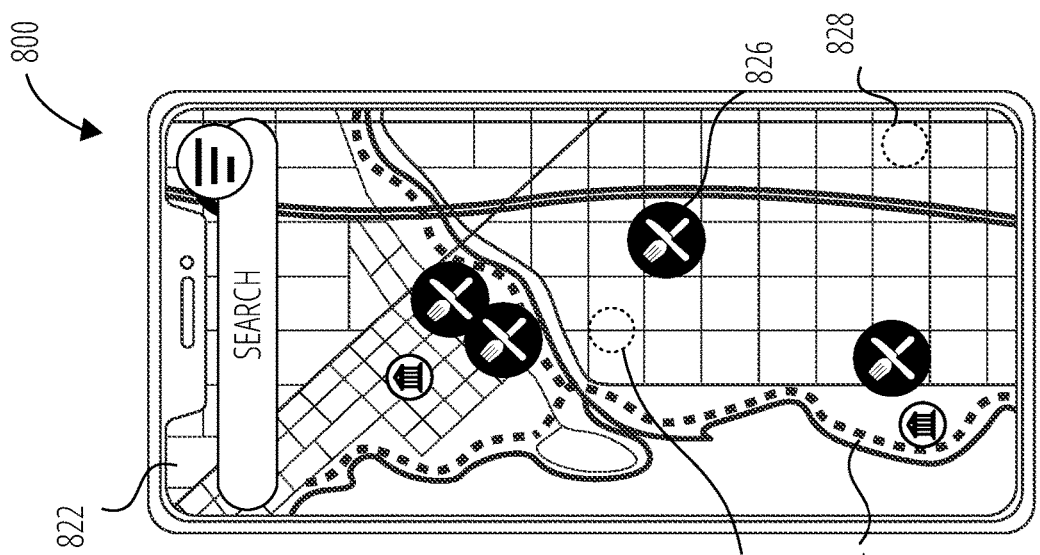
FIG. 8A-FIG. 8C illustrate a selective interactive graphical interface feature enhancement 800 in accordance with one embodiment.
Figure 8B:
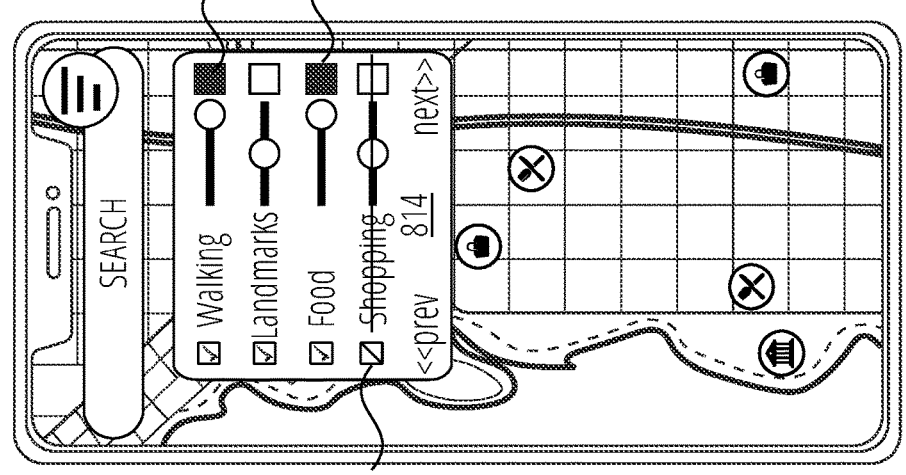
Figure 8A:
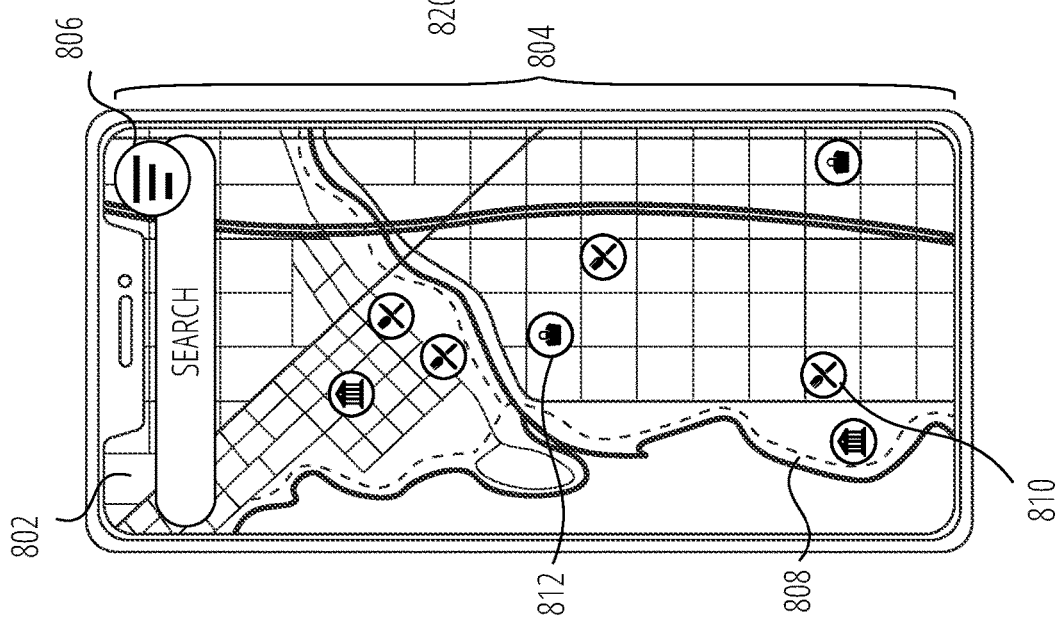

FIG. 8A-FIG. 8C illustrate selective interactive graphical interface feature enhancement 800 in accordance with one embodiment. When looking at textual and graphical elements on a map, similar elements may be given the same attributes so that they are displayed similarly. For example, parks may be green, water may be blue, highways may be yellow lines of a greater line weight than that used for gray lines representing surface streets. When multiple elements are being displayed, the user may have the ability using the disclosed solution to adjust beyond a simple zoom in and out. The user may be able to dynamically show/hide and enlarge/diminish map elements, as well as adjust color for visibility based on contextual need.

The key difference between the solution described here and conventional internet map display interfaces is the nature of the information displayed. Unlike other interfaces that provide an active search and a layer of additional data that is presented on an existing map, the purpose of the solution disclosed herein is less about adding information to the display and more about giving the end user control on the level of granularity/fidelity displayed as well as the ability to emphasize (via size manipulation) specific points of interest.

FIG. 8A illustrates a web page 802 displaying an interactive graphical interface 804 for a city map, as well as a user interface access icon 806. The interactive graphical interface 804 may include walking path page elements 808, food icon page elements 810, and shopping icon page elements 812, among other page element types. These page elements may in one embodiment be encoded as vector graphics in the web page code files controlling display of the interactive graphical interface 804.

FIG. 8B illustrates a user interface 814 that may be displayed when a web user interacts with the user interface access icon 806, according to the disclosed solution. The user interface 814 may allow navigation among multiple pages of options in one embodiment. The user interface 814 may present options for walking path page element adjustment 816, food icon page element style adjustment 818, shopping icon page element style adjustment 820, etc. For example, the user interface 814 may provide checkboxes allowing a user to include or omit display of the various page elements, linear slides allowing the user to change the size or weight of page elements, color swatch boxes that, when tapped, allow the user to select from a panel of color swatches to change the color of page elements, or other options as are well understood in the art.

As illustrated, the user interface 814 may be interacted with by a user so as to allow the user to increase the line weights of walking path page elements 808 through walking path page element adjustment 816. The user may change the size and color of food icon page elements 810 through food icon page element style adjustment 818, and may elect to omit display of shopping icon page elements 812 through shopping icon page element style adjustment 820.

FIG. 8C illustrates the interactive graphical interface 804 of the enhanced web page 822 as it may appear after the user's dynamic adjustments are applied. The adjusted walking path page elements 824 may have a greater line weight than the walking path page elements 808 exhibit by default. The adjusted food icon page elements 826 may be larger than the default food icon page elements 810, and may be displayed using different colors. The shopping icon page elements 812 may be hidden or invisible, as indicated by the hidden shopping icon page elements 828 shown. Additional analogous capabilities will suggest themselves to those skilled in the art.

LISTING OF DRAWING ELEMENTS 100 conventional approach
102 web browser
104 display device
106 size selector
108 web page contents
200 process
202 block
204 block
206 block
208 block
210 block
300 web page code files
302a page element
302b page element
302c page element
302d page element
304a style tag
304b style tag
304c style tag
304d style tag
306 variable attribute
308 default attribute value
310 page attributes
312 page size display data
314 anticipated page size
316 page background color
318 text attributes
320 text size
322 text color
324 image attributes
326 image size
328 vector graphic attributes
330 vector graphic size
332 vector graphic color
400 routine
402 block
404 block
406 block
408 block
410 block
412 block
414 block
500 system
502 Internet
504 device
506 web browser
508 extraction module
510 request signal
512 style tags and variable attributes
514 default attribute values
516 page size display data
518 attribute database
520 response signal
522 labels and display controls
524 compatible range of attribute values
526 user interface display parameters
528 user interface controller
530 web user
532 present user interface signal
534 selection signals
536 access signal
600 computing device
602 monitor or graphical user interface
604 processor(s)
606 output device(s)
608 input device(s)
610 volatile memory
612 communication network interface
614 nonvolatile memory
616 communication network
618 bus subsystem
620 data processing system
622 instructions
624 database
626 database
700 adjusting web article elements
702 web page
704 user interface access icon
706 heading page element
708 body text page element
710 image page element
712 user interface
714 title display controls
716 image display controls
718 enhanced web page
720 adjusted title page element
722 adjusted image page element
724 body text display controls
726 adjusted body text page element
800 selective interactive graphical interface feature enhancement
802 web page
804 interactive graphical interface
806 user interface access icon
808 walking path page element
810 food icon page element
812 shopping icon page element
814 user interface
816 walking path page element adjustment
818 food icon page element style adjustment
820 shopping icon page element style adjustment
822 enhanced web page
824 adjusted walking path page element
826 adjusted food icon page element
828 hidden shopping icon page element Herein, references to "one embodiment" or "an embodiment" do not necessarily refer to the same embodiment, although they may. Unless the context clearly specifies otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the disclosure as claimed. The scope of disclosed subject matter is not limited to the depicted embodiments but is rather set forth in the following claims.

What is claimed is:

1. A method for real-time dynamic web page display enhancement comprising:
    requesting, by an end web user, at least one web page code file using a web browser, wherein the at least one web page code file contains at least one page element having at least one style tag with at least one variable attribute assigned a default attribute value;
    extracting the at least one style tag and the at least one variable attribute from the at least one web page code file using an extraction module;
    sending a request signal from the extraction module to an attribute database, wherein the request signal includes the at least one style tag and the at least one variable attribute to be used as search parameters in the attribute database;
    returning from the attribute database to a user interface controller a response signal, wherein the response signal includes at least one label associated with the at least one style tag and at least one display control that selectively presents at least one compatible range of attribute values associated with the at least one variable attribute;
    sending a present user interface signal from the user interface controller to the web browser, wherein the present user interface signal instructs the web browser to generate and display to the end web user a user interface comprising the at least one label and the at least one display control;
    accepting at least one selection signal from the end web user through the at least one display control of the user interface to the web browser, wherein the at least one selection signal corresponds to a selection by the end web user of at least one selected attribute value from among the at least one compatible range of attribute values; and generating an enhanced web page, wherein the at least one selection signal instructs the web browser to compile the at least one web page code file using the at least one selected attribute value in place of the default attribute value for the at least one variable attribute of the at least one style tag, such that the enhanced web page is displayed with the at least one page element appearing as having the at least one selected attribute value.

2. The method of claim 1, further comprising:
instructing the web browser to display a user interface access icon; and
on condition that the end web user interacts with the user interface access icon:
sending an access signal to the user interface controller, wherein the access signal instructs the user interface controller to send the present user interface signal to the web browser.

3. The method of claim 1, wherein the attribute database includes a plurality of curated compatible ranges of attribute values and returns the at least one display control associated with at least one of the plurality of curated compatible ranges of attribute values based on predefined selection rules.

4. The method of claim 3, wherein the plurality of curated compatible ranges of attribute values comprise predefined attribute value ranges curated to provide at least one of:
variations of common default attribute values;
improved bandwidth performance;
selective interactive graphical interface feature enhancement;
high visibility contrast;
improved dark-mode visibility;
conversion to a colorblind-friendly color palette;
text magnification;
image magnification; and
web page decluttering.

5. The method of claim 3, further comprising:
extracting page size display data indicating an anticipated page size using the extraction module from at least one of the at least one web page code file, the web browser, and a device having the web browser installed;
sending the request signal further comprising the page size display data to the attribute database, wherein the page size display data is used to filter the plurality of curated compatible ranges of attribute values to a filtered set of compatible ranges of attribute values compatible with the anticipated page size; and
returning the at least one display control associated with the at least one compatible range of attribute values selected from among the filtered set of compatible ranges of attribute values.

6. The method of claim 3, further comprising:
extracting the default attribute value assigned to the at least one variable attribute of the at least one style tag from the at least one web page code file using the extraction module;
sending the request signal further comprising the default attribute value to the attribute database, wherein the default attribute value is included in the search parameters used in the attribute database;
dynamically generating at the attribute database at least one custom compatible range of attribute values based on at least one of comparison with the default attribute value and transformation of the default attribute value; and
returning the at least one display control associated with the custom compatible range of attribute values.

7. The method of claim 6, wherein the default attribute value is included in the custom compatible range of attribute values, and the at least one display control offers the default attribute value as an initially selected option to the end web user.

8. The method of claim 1, wherein the at least one display control is at least one of:
a sliding scale control selectably presenting the at least one compatible range of attribute values at positions along a linear scale for selection by the end web user;
a selection panel presenting the at least one compatible range of attribute values as an array of options for selection by the end web user; and
a check box presenting the at least one compatible range of attribute values for enablement and disablement by the end web user.

9. The method of claim 1, wherein the extraction module parses the at least one web page code file for at least one of:
page attributes;
text attributes;
image attributes; and
vector graphic attributes.

10. The method of claim 9, wherein the at least one display control offers the end web user options to modify at least one of:
text size;
text color;
page background color;
image size;
image visibility;
vector graphic size; and
vector graphic color.

11. A computing apparatus comprising:
a processor; and
a memory storing instructions that, when executed by the processor, configure the apparatus to:
request, by an end web user, at least one web page code file using a web browser, wherein the at least one web page code file contains at least one page element having at least one style tag with at least one variable attribute assigned a default attribute value;
extract the at least one style tag and the at least one variable attribute from the at least one web page code file using an extraction module;
send a request signal from the extraction module to an attribute database, wherein the request signal includes the at least one style tag and the at least one variable attribute to be used as search parameters in the attribute database;
return from the attribute database to a user interface controller at least one label associated with the at least one style tag and at least one display control that selectively presents at least one compatible range of attribute values associated with the at least one variable attribute;
send a present user interface signal from the user interface controller to the web browser, wherein the present user interface signal instructs the web browser to generate and display to the end web user a user interface comprising the at least one label and the at least one display control;

accept at least one selection signal from the end web user through the at least one display control of the user interface to the web browser, wherein the at least one selection signal corresponds to a selection by the end web user of at least one selected attribute value from among the at least one compatible range of attribute values; and generate an enhanced web page, wherein the at least one selection signal instructs the web browser to compile the at least one web page code file using the at least one selected attribute value in place of the default attribute value for the at least one variable attribute of the at least one style tag, such that the enhanced web page is displayed with the at least one page element appearing as having the at least one selected attribute value.

12. The computing apparatus of claim 11, wherein the instructions further configure the apparatus to:

instruct the web browser to display a user interface access icon; and on condition that the end web user interacts with the user interface access icon:

send an access signal to the user interface controller, wherein the access signal instructs the user interface controller to send the present user interface signal to the web browser.

13. The computing apparatus of claim 11, wherein the attribute database includes a plurality of curated compatible ranges of attribute values and returns the at least one display control associated with at least one of the plurality of curated compatible ranges of attribute values based on predefined selection rules.

14. The computing apparatus of claim 13, wherein the plurality of curated compatible ranges of attribute values comprise predefined attribute value ranges curated to provide at least one of:

variations of common default attribute values;
improved bandwidth performance;
selective interactive graphical interface feature enhancement;
high visibility contrast;
improved dark-mode visibility;
conversion to a colorblind-friendly color palette;
text magnification;
image magnification; and
web page decluttering.

15. The computing apparatus of claim 13, wherein the instructions further configure the apparatus to:

extract page size display data indicating an anticipated page size using the extraction module from at least one of the at least one web page code file, the web browser, and a device having the web browser installed;

send the request signal further comprising the page size display data to the attribute database, wherein the page size display data is used to filter the plurality of curated compatible ranges of attribute values to a filtered set of compatible ranges of attribute values compatible with the anticipated page size; and return the at least one display control associated with the at least one compatible range of attribute values selected from among the filtered set of compatible ranges of attribute values.

16. The computing apparatus of claim 13, wherein the instructions further configure the apparatus to:

extract the default attribute value assigned to the at least one variable attribute of the at least one style tag from the at least one web page code file using the extraction module:

send the request signal further comprising the default attribute value to the attribute database, wherein the default attribute value is included in the search parameters used in the attribute database;

dynamically generate at the attribute database at least one custom compatible range of attribute values based on at least one of comparison with the default attribute value and transformation of the default attribute value; and return the at least one display control associated with the custom compatible range of attribute values.

17. The computing apparatus of claim 16, wherein the default attribute value is included in the custom compatible range of attribute values, and the at least one display control offers the default attribute value as an initially selected option to the end web user.

18. The computing apparatus of claim 11, wherein the at least one display control is at least one of:

a sliding scale control selectably presenting the at least one compatible range of attribute values at positions along a linear scale for selection by the end web user;

a selection panel presenting the at least one compatible range of attribute values as an array of options for selection by the end web user; and a check box presenting the at least one compatible range of attribute values for enablement and disablement by the end web user.

19. The computing apparatus of claim 11, wherein the extraction module parses the at least one web page code file for at least one of:

page attributes;
text attributes;
image attributes; and
vector graphic attributes.

20. The computing apparatus of claim 19, wherein the at least one display control offers the end web user options to modify at least one of:

text size;
text color;
page background color;
image size;
image visibility;
vector graphic size; and
vector graphic color.

* * * * *